United States Patent Office
3,110,712
Patented Nov. 12, 1963

3,110,712
METHOD FOR REMOVING THIOL-CONTAMI-
NANTS FROM THIOETHER SOLUTIONS
Martha A. Hill, Rochester, N.Y., and Albert E. Ballard,
Palm City, Fla., assignors to Eastman Kodak Com-
pany, Rochester, N.Y., a corporation of New Jersey
No Drawing. Filed Sept. 2, 1960, Ser. No. 53,621
3 Claims. (Cl. 260—240)

This invention relates to a method for removing thiol-containing compounds from solutions of thioethers. More particularly this invention relates to a method for removing stain-producing thiol-containing compounds from solutions of photographic additives.

Quite often it becomes desirable to remove thiol-containing compounds from solutions of thioethers. For instance in photography various thiol-containing compounds will produce stain in the coated film product and where such compounds are contained as contaminants in photographic additives, it becomes desirable that they be removed. In many instances, however, as in the case with photographic additives which comprise thioethers, both the desired photographic additive and the undesired stain-producing contaminants are thiol-containing compounds. As is known in the art attempts to remove thiol-containing contaminants from solutions of organic thio-containing compounds such as the thioethers using conventional methods, including selective reaction with metallic reactants, usually result in the objectionable formation of undesirable and unfilterable colloidal dispersions of metallic reactants or loss of desired additive itself. A method of purification to be suitable for use in the removal of thiol-containing contaminants from solutions of photographic additives must be able to remove trace amounts of such contaminants without removing the desired additives themselves, and must also be capable of doing so without recontaminating the purified solution with an excess of other photographically undesirable ionic or colloidal materials.

It is, therefore, an object of the present invention to provide a method for the removal of thiol-containing contaminants from solutions of thioethers. Another object of this invention is to provide a method for the selective removal of thiol-containing contaminants from solutions of thioethers without concomitant reaction with the thioethers and without recontaminating the purified product with new but equally objectionable contaminants. A further object is to provide a method for the removal of thiol-containing contaminants from solutions of photographic additives. A still further object is to provide a process for obtaining non-staining photographic additive materials. These and other objects will become apparent from the description and claims which follow.

These objects are accomplished by contacting a thiol-compound-contaminated solution of a thioether with an inert insoluble supporting material which has deposited thereon a particular reactant, i.e., silver oxide, carbonate or halide, under the conditions hereinafter described. According to the invention, a solvent is used for dissolving the organic thioether which has very limited capacity to dissolve the silver compound deposited onto the supporting material. In other words, the silver compound is relatively insoluble in the solvent for the thioether. Where such relative insolubility exists there occurs an unexpected result which accomplishes one of the primary objects of this invention, that is, to remove stain-producing thiol-containing contaminants from solutions of thioethers without recontaminating the purified solution with undesirable colloidal or ionic materials and without reacting with the additive itself.

The silver compounds which can be employed as the reactants when deposited on an inert supporting material comprise silver oxide, silver carbonate, and silver halide. With each of the silver compounds particular solvents for the thioether can be selected according to the solubility of the silver compound in the solvent. For example, acetone is a preferred solvent for use in conjunction with silver oxide. In like manner, silver chloride is ideally suited for removing thiol-containing contaminants from organic thioether compounds in aqueous solutions. Similarly, silver carbonate having a relative insolubility in solvents which closely approximates that of silver oxide, can thus be substituted for it. For use in photography, accordingly, the invention permits the selective separation of staining thiol-containing compounds from non-staining thiol-containing compounds.

When in the present specification and claims thereto we refer to thiol-containing contaminants, we mean to include the thiol function (—SH) and the thiocarbamyl functions

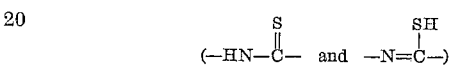

including thiocarmamides

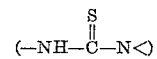

which give rise to thiols by tautomerization.

When in the present invention we refer to thioethers, we mean to include (1) cyclized thioethers such as thiazolidones where the sulfur atom is contained in a heterocyclic nucleus, and (2) arylsulfides such as the ortho thioether derivatives of 1-naphthols and phenols.

Typical cyclized thioethers which are purified according to our invention are advantageously represented by the following general formula:

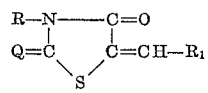

wherein R represents a hydrogen atom, an alkyl group (e.g. methyl, ethyl, β-hydroxyethyl, β-sulfoethyl, β-diethoxyethyl, propyl, isopropyl, butyl, isobutyl, amyl, hexyl, heptyl, octyl, nonyl, decyl, lauryl, cetyl, etc.), a cycloalkl group (e.g. cyclopentyl, cyclohexyl, etc.), an aryl group (e.g. phenyl, o-, m-, and p-tolyl, o-, m-, and p-ethylphenyl, p-isopropylphneyl, p-amylphenyl, o-, m-, and p-methoxyphenyl, o-, m-, and p-ethoxyphenyl, β-hydroxyethylphenyl, o-, m-, and p-chlorophenyl, o-, m-, and p-hydroxyphenyl, o-, m-, and p-sulfophenyl (and alkali metal salts thereof, e.g. sodium, potassium, etc.), 4-methoxy-3-sulfophenyl (and alkali metal salts thereof, e.g. sodium, potassium, etc.), 2,4-dicarboxymethylphenyl (and alkali metal salts thereof, e.g. sodium, potassium, etc.), o-, m-, and p-carboxyphenyl (and alkali metal salts thereof, e.g. sodium, potassium, etc.), 3-(3-sulfobenzamido) phenyl (and alkali metal salts thereof, e.g. sodium, potassium, etc.), o-carbobutoxyphenyl, diamylphenoxyacetoxyphenyl, etc., or an aralkyl group (e.g. benzyl, β-phenylethyl, α-phenylethyl, etc.), R₁ represents an aryl group (e.g. those aryl groups defined above wherein R is an aryl group), and Q represents a divalent non-metallic atom (e.g. oxygen, sulfur, etc.) or imino radical (e.g. imino, phenylimino, o-, m-, and p-chlorophenylimino, benzylimino, β-phenylethylimino, α-phenylethylimino, o-, m-, and p-tolylimino, o-, m-, and p-ethylphenylimino, p-amylphenylimino, o-, m-, and p-ethoxyphenylimino, etc.

Advantageously, the compounds to be purified can be dissolved or dispersed in a solvent medium; alternatively compounds of Formula I which contain alkali metal salts of carboxy phenyl, sulfophenyl, etc., may be dissolved or dispersed in an aqueous medium.

Other cyclized thioethers which are readily purified according to this invention can be prepared by condensing together 5-(3-hydroxy benzylidene)-3-phenyl-2-phenyl-imino-4-thiazolidone and 2,4-ditertiary amyl phenoxy acetyl chloride. The compound of this condensation is 5-[3- (2,4 - ditertiaryamylphenoxyacetoxy)-benzylidene]-3-phenyl-2-phenylimino-4-thiazolidone and has the following formula:

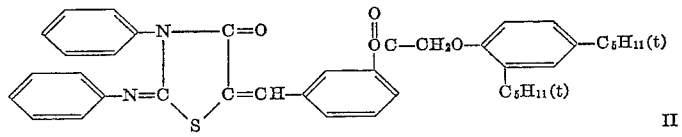

II

Another thiazolidone compound which can be purified according to our invention is 5-benzal-3-n-cetyl-2-phenyl-imino-4-thiazolidone having the following formula:

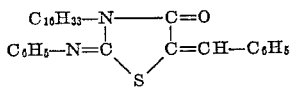

III

It is presumed that the undesirable thiol-containing contaminants found to be contained in solutions of thiazolidones, examples of which are herewith described, become contained in intimate admixture during the process of preparation.

Typical ortho thioether derivatives of 1-naphthols and phenols purified according to our invention comprise o-thioether-substituted naphthols. These compounds may be represented by the formula:

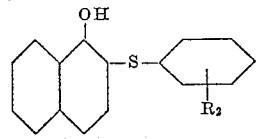

wherein $R_2$ may be nitro, chloro, acylamido, and alkylcarbamyl groups. Representative o-thioether-substituted phenolic couplers are 2-(2-nitrophenylthio)-1-naphthol, 2-(2-nitro-4-chlorophenylthio-1-naphthol, 2-(3 - octadecylcarbamylphenylthio)- 1-naphthol, 2-(2-palmitoylamidophenylthio) - 1 - naphthol, and 2-(2-palmitoylamido-4-chlorophenylthio)-1-naphthol.

Typical, stain-producing contaminants which can be removed from solutions of thioethers according to our invention are (1) aromatic and heterocyclic thiols and (2) thiocarbamyl compounds (including thiocarbamides). Typical examples of these compounds are the following:

| Compound | Formula | |
|---|---|---|
| 2-Benzoxazolethiol | (benzoxazole)C—SH | IV |
| 2-Mercaptobenzothiazole | (benzothiazole)C—SH | V |
| 2-Mercapto-4,6,6-trimethylthiazine | $CH_3$, $CH_3$—C, HC, C—SH, N, C, $CH_3$ | VI |
| Thiobenzamide | $C_6H_5$—C(=S)—$NH_2$ | VII |
| Phenylbenzylthiourea | (phenyl)—NH—C(=S)—NH—$CH_2$—(phenyl) | VIII |
| Bis(p-methoxyphenyl)thiourea | $CH_3O$—(phenyl)—NH—C(=S)—NH—(phenyl)—$OCH_3$ | IX |
| 1-Cetyl-3-phenyl-2-thiourea | $CH_3(CH_2)_{14}CH_2$—NH—C(=S)—NH—(phenyl) | X |
| 2-Nitrothiophenol | $NO_2$-(phenyl)—SH | XI |
| 2-Nitro-4-chlorothiophenol | Cl—(phenyl, $NO_2$)—SH | XII |

| Compound | Formula | |
|---|---|---|
| 3-Octadecylcarbamylthiophenol | 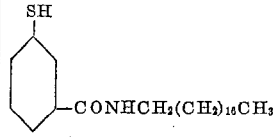 | XIII |
| 2-Palmitoylamidothiophenol | 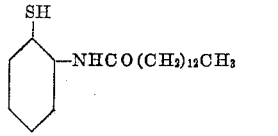 | XIV |
| 2-Palmitoylamido-4-chlorothiophenol | 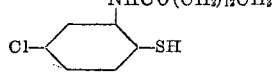 | XV |

Other applications and uses of this invention for the removal of other thiol-containing contaminants from solutions of thioethers and from solutions of other sulfur-containing compounds and from photographic additives are obvious.

In the practice of the present invention the silver compound deposited on the inert supporting material must be relatively insoluble in the solvent for the compound to be purified, i.e., as per the present invention, thioether.

By relative insolubility we mean the deposited silver salt has some but only very slight solubility in the solvent. Ideally, the solubility of the adsorbed silver salt in the solvent is from about 0.10 milligram per liter to about 0.45 milligram per liter which is a relative insolubility suitable for the purification of solutions containing up to 200 parts per million of a thiol-containing contaminant.

Solvents used in the purification process must be inert, that is, the solvent does not decompose or combine with the silver compound or with the supporting material or with the organic compound to be purified although, of course, it must dissolve the organic compound to be purified. Thus, by means of this invention, the structure and composition of the supporting materials remains unchanged while at the same time the concentration of the stain-producing contaminant is reduced to an unobjectionable level without contamination of the purified solution with an excess of silver ions or undesirable colloidal materials. The typical solvents used in this invention are water, acetone, diethyl ketone, chloroform, chloroform-acetone in combination, methanol, and ethanol.

The supporting materials which are the best suited according to the objects of this invention are those which have a capacity to hold an inorganic salt formed in situ by chemical reaction such that on contact with a solution of the stain-producing contaminant, there results the removal of the contaminant from solution without recontamination of the purified solution as hereinbefore indicated. Substances which can be used in our invention as supporting materials include diatomaceous earth, fuller's earth, silica gel, silicates or other siliceous minerals, cellulose paper, polymer resin compounds, and the like. The supporting materials of this invention should be insert, adsorbent, and have firmness.

The simplest method of impregnating the supporting materials of our invention consists of soaking the porous support in a solution of silver nitrate and then with stirring, adding an equivalent amount of an alkali hydroxide, carbonate or halide. A silver compound is thereby formed which remains in close adherence to the supporting material throughout the latter's use in the process of this invention. The silver compound-impregnated material is then washed with water and finally with the solvent of choice, for example acetone, where a silver oxide-impregnated supporting material is to be used for separating a contaminant from a compound dissolved in acetone as the solvent. Depending upon the supporting material used, the first filtrate in the wash may show a brown suspension of loosened precipitate, but further washings will become clear. After thorough washing a specially prepared supporting material is obtained which is capable of removing the thiol-containing contaminants from solutions containing them in intimate admixture; the solvent chosen to be used with a particular silver compound-impregnated material should conform with the relative insolubility requirements hereinbefore described.

In a manner of practice of this invention, a solution of a contaminated material to be purified is contacted with a supporting material which has deposited thereon a silver compound of the type disclosed herein and then the supporting material is removed from the solution by filtration through a porous filter, by sedimentation, or by centrifuging at a moderate speed. The invention can be practiced in another way as well, that is, by placing the impregnated supporting material in a glass packing column where intimate contact on filtration can occur between the silver compound and the thiol-containing compounds. In order to remove the contaminant compounds most effectively, it has been found that the silver compound impregnated support should be placed above a paper filter pad within the packed column so that mild suction may be applied to the lower end of the column to assist in this process. A thin layer of glass wool and some glass beads can also be used as a weight on top of the packing material to keep it from separating where it is necessary to prewarm the solution to be filtered to 50° C. to prevent precipitation of purified solution at the column exit due to the cooling effect of the suction. Flow rates through the column packed in the manner indicated can be further controlled by applying air pressure at the top of the column. Production batches of photographic additives known to contain about 80 parts per million of thiol-compound contaminants were purified to less than 5 parts per million by one passage through the packed column impregnated and operated according to this invention.

In the following examples we have set forth several of the preferred embodiments of our invention, but they are presented only for purposes of illustration and not as a limitation on the scope of the invention.

*Example I*

A suitable impregnated supporting material for use in removing stain-producing contaminants from solutions of thioethers was prepared by suspending 50 grams of diatomaceous earth in 250 milliliters of N/10 silver nitrate solution and then adding 50 milliliters of N/2 sodium hydroxide slowly with stirring to encourage maximum contact with the diatomaceous earth. The product was then recovered by suction filtration and washed repeatedly with distilled water and acetone until the washings were clear and colorless. An increase of 2.7 grams (93% theoretical) in the dry weight of the diatomaceous earth was attributed to the silver oxide.

The process for removing a stain-producing contaminant from an acetone solution of a thiazolidone compound was carried out according to the following procedure.

Five hundred milligrams of the filter medium were inserted in a glass column, as column packing, in series with glass wool and glass beads to hold the material in place. The temperature of the column was maintained at 50±0.1° C. with circulating water. After each addition of the solution for purification, the upper end of the column was pressured with air for control of the flow rate of solution through the column exit. Effluent solutions were filtered through filter paper to ensure removal of any particulate matter which might have been dislodged from the column packing. Following this step the purification product was recovered by evaporation of the solvent under partial vacuum.

An acetone solution of 5-benzylidene-3-hexadecyl-2-phenylimino-4-thiazolidone was used as the starting material in this example and was estimated to contain about 80 parts per million of the stain-producing contaminant, 1-cetyl-3-phenyl-2-thiourea, by colorimetric analysis. 40 grams of the starting material were dissolved in 453 ml. of warm redistilled acetone; this composition was designed for preparing a 10% solution by weight. The prepared solution was passed through the column in one uninterrupted operation, refilling the reservoir from time to time with warm solution as indicated by the level of the liquid in the column.

Passage of the entire sample through the silver oxide impregnated diatomaceous earth column required 70 minutes. The calculated flow rate was 1.8 grams of solute per square inch per minute.

*Example II*

Silver oxide impregnated cellulose supporting material for use in removing stain-producing contaminants from solutions of thioethers was prepared by shredding and dispersing 50 grams of cellulose from press cut filter sheet in 750 ml. of N/30 silver nitrate solution and then slowly adding 50 milliliters of N/2 sodium hydroxide with stirring. The product was then washed repeatedly with distilled water and acetone. An increase of 2.3 grams (79% theoretical) in the dry weight of the fibers was attributed to silver oxide.

The stain-producing contaminant and the starting material was the same for this example as for Example I. The process for filtering the contaminated solution was the same as in Example I except that passage of an equivalent sample through the silver oxide impregnated cellulose starting material required 60 minutes as compared to 70 minutes in Example I. Flow rate for the present example was calculated at 2.1 grams of solute per square inch per minute.

The purity of the products obtained according to the method disclosed in Examples I and II was established by colorimetric and photographic tests. A parts-per-million analysis using a chemical colorimetric test showed that after one pass through the silver oxide-diatomaceous earth column (Example I) the starting material which contained 80 parts per million of contaminant was purified to 0 parts per million of contaminant after filtration. Where the silver oxide-cellulose supporting material was used (Example II), the chemical colorimetric tests showed that after one pass through the column the contaminant level was reduced from 80 parts per million to 2 parts per million.

As employed in the purification of other solutions of photographic additives the following results were obtained. An acetone solution of a photographic additive which contained 100 parts per million of stain-producing 2-benzoxazolethiol was purified by the process of Examples I and II to the extent that 98% of the contaminant was removed. Similarly, acetone solutions of photographic additives which contained 2-mercaptobenzothiazole, thiobenzamide, and phenylbenzylthiourea as stain-producing contaminants at a contaminant level of approximately 100 parts per million were purified according to the invention to the extent that 100% of 2-mercaptobenzothiazole and thiobenzamide and 98% of phenylbenzylthiourea were removed in a single pass through a filter and process as set forth in Examples I and II.

The photographic tests used to determine presence of stain-producing contaminants in batches of the photographic additives showed that after one pass through a supporting material impregnated with a silver compound the stain-producing contaminants were reduced to a level which gave no evidence of stain even under the most rigorous testing conditions.

In conducting the preparation of repeat batches of photographic additives using the impregnated materials according to the present invention it has been found that the best results are obtained where freshly prepared supporting materials are used. One of the several advantages of the method of the present invention is that the materials used are cheap and readily available and the process easy to operate and gives a product of high purity.

The cyclized thioethers, i.e., thiazolidones, referred to in the present specification can be prepared according to the methods described in Sawdey U.S. Patent 2,798,067, issued July 2, 1957, and 2,739,888, issued March 27, 1956, and Sawdey et al. U.S. Patent 2,739,971, issued March 27, 1956. The o-thio-substituted thioethers, i.e., ortho thioether derivatives of 1-naphthols can be prepared according to a general method as follows: A solution of 14.4 grams (.1 mole) α-naphthol and 19 grams (.1 mole) 2-nitrophenyl sulfenyl chloride in 100 cc. of dry carbon tetrachloride was heated under reflux for three hours. The product, which precipitated on cooling, was recrystallized from methanol giving 22.9 grams (77%) of greenish-yellow crystalline powder melting at 165–167° F. The powder was calculated for $C_{16}H_{10}NO_3S$: i.e., C, 64.6; H, 3.7; and S, 4.7 and was found to contain as follows: C, 64.4; H, 3.6; and S, 4.4.

The invention has been described in detail with particular reference to preferred embodiments thereof but it will be understood that variations and modifications can be effected within the spirit and scope of the invention as described hereinabove and as defined in the appended claims.

We claim:

1. The process for treating a thiol-contaminated acetone solution of 5-benzylidene-3-hexadecyl-2-phenylimino-4-thiazolidone containing up to 200 parts per million based on the weight of the said thiazolidone of 1-cetyl-3-phenyl-2-thiourea as a contaminant which comprises passing said acetone solution through a bed containing silver oxide supported on diatomaceous earth, chemically reacting substantially all of said contaminant with said silver oxide to form a silver derivative substantially insoluble in said acetone solution, and separating by filtration said derivative from the resulting acetone solution of the said thiazolidone.

2. The process for treating a thiol-contaminated solution of 5-benzylidene-3-hexadecyl-2-phenylimino-4-thiazolidone containing up to 200 parts per million based on the weight of the said thiazolidone of 1-cetyl-3-phenyl-2-thiourea as a contaminant which comprises passing said solution through a bed of supported silver oxide, chemically reacting substantially all of said contaminant with said silver oxide to form a silver derivative substantially insoluble in said solution, and separating by filtration said silver derivative from the resulting solution of the said thiazolidone.

3. The process for treating a thiol-contaminated solution of a thiazolidone having the formula

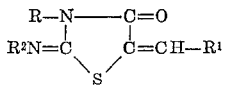

wherein R is a thiol-free radical selected from the group consisting of alkyl and phenyl, and R¹ and R² are thiol-free phenyl radicals, said solution containing up to 200 parts per million based on the weight of said thiazolidone of a thiol contaminant capable of forming a silver derivative substantially insoluble in said solution with a silver compound selected from the group consisting of silver oxide, silver carbonate and silver chloride, which comprises contacting said solution with said silver compound, chemically reacting said thiol contaminant with said silver compound and thereby forming said silver derivative, and separating said silver derivative from said solution.

References Cited in the file of this patent

UNITED STATES PATENTS

| | | |
|---|---|---|
| 2,364,416 | Ayers et al. | Dec. 5, 1944 |
| 2,791,540 | Kimberlin et al. | May 7, 1957 |

OTHER REFERENCES

Bell et al.: Industrial and Engineering Chemistry, Analytical Edition, volume 13, No. 3, pages 297–299 (1941).

Natson: Acta Physiochemica, U.S.S.R., volume 21, No. 3, pages 431–6 (1946).

Hunig-Annalen der Chemie, volume 574, page 119 (1952).

Organic Analysis, volume 1, pages 331–333, Interscience Publishers, Inc., New York, copyrighted 1953.

Reid: Organic Chemistry of Bivalent Sulfur, volume 1, pages 148 and 156–7, Chemical Publishing Co. Inc., New York (1958).

Chemical Abstracts, volume 54, column 13,948 (1960).